(12) United States Patent
Tansley

(10) Patent No.: US 11,390,451 B2
(45) Date of Patent: *Jul. 19, 2022

(54) MOBILE REFRIGERATION APPARATUS

(71) Applicant: The Sure Chill Company Limited, Cardiff (GB)

(72) Inventor: Ian Tansley, Cardiff (GB)

(73) Assignee: THE SURE CHILL COMPANY LIMITED, Cardiff (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,466

(22) Filed: Aug. 20, 2020

(65) Prior Publication Data
US 2020/0407150 A1 Dec. 31, 2020

Related U.S. Application Data

(63) Continuation of application No. 15/564,424, filed as application No. PCT/US2016/025924 on Apr. 4, 2016, now Pat. No. 10,752,424.

(Continued)

(51) Int. Cl.
*B65D 81/38* (2006.01)
*F25D 3/06* (2006.01)

(52) U.S. Cl.
CPC ........... *B65D 81/3825* (2013.01); *F25D 3/06* (2013.01)

(58) Field of Classification Search
CPC ..... A61J 2200/44; B65D 81/18; B65D 81/22; B65D 81/3825; B65D 81/3827; B65D 81/3832; B65D 81/3834; B65D 2303/00; B65D 2251/04; F25D 3/00; F25D 3/06; F25D 3/08; F25D 11/003; F25D 11/006
See application file for complete search history.

(56) References Cited

U.S. PATENT DOCUMENTS

| 5,232,095 A | * | 8/1993 | Childers | ................ B65D 81/02 |
| | | | | 206/583 |
| 5,295,365 A | * | 3/1994 | Redford | .................... F25D 3/08 |
| | | | | 62/265 |

(Continued)

FOREIGN PATENT DOCUMENTS

| CN | 101421568 A | 4/2009 |
| DE | 3627201 A1 | 4/1987 |

(Continued)

OTHER PUBLICATIONS

The Engineering Toolbox. "Water-Density and Specific Weight". Oct. 15, 2014. Retrieved from Internet Archive. <https://web.archive.org/web/20141015173722/ http://www.engineeringtoolbox.com/water-density-specific-weight-d_595.html> (Year: 2014).*

(Continued)

*Primary Examiner* — Eric S Ruppert
*Assistant Examiner* — Hans R Weiland
(74) *Attorney, Agent, or Firm* — Perkins Coie LLP; Colin Fowler

(57) ABSTRACT

A refrigeration unit designed for prolonged cooling with intermittent power supplies and adaptability to rotation is described. A spherical design is utilized comprising internal compartments that shift according to orientation of the sphere and enable internal cycling of water at substantially 4 degrees Celsius about an icy core.

21 Claims, 13 Drawing Sheets

Related U.S. Application Data

(60) Provisional application No. 62/151,318, filed on Apr. 22, 2015, provisional application No. 62/151,322, filed on Apr. 22, 2015, provisional application No. 62/143,662, filed on Apr. 6, 2015.

(56) References Cited

U.S. PATENT DOCUMENTS

| | | | | |
|---|---|---|---|---|
| 6,490,880 | B1 * | 12/2002 | Walsh | A01N 1/02 |
| | | | | 62/371 |
| 6,782,711 | B2 * | 8/2004 | Abfalter | F25D 3/08 |
| | | | | 62/457.7 |
| 7,325,690 | B2 * | 2/2008 | Cognard | B65D 81/00 |
| | | | | 206/583 |
| 7,713,686 | B2 * | 5/2010 | Poo | A01N 1/0263 |
| | | | | 435/1.2 |
| 2007/0245763 | A1 | 10/2007 | Uchida et al. | |
| 2012/0027903 | A1 | 2/2012 | Devlin et al. | |

FOREIGN PATENT DOCUMENTS

| | | |
|---|---|---|
| EP | 157751 A2 | 10/1985 |
| KR | 20120081798 A | 7/2012 |
| WO | 03101861 A2 | 12/2003 |
| WO | 2013110957 A2 | 8/2013 |

OTHER PUBLICATIONS

Chinese Office Action dated Jul. 15, 2019 of Chinese Application No. 201680033067.2 (10 pages).

International Search Report and Written Opinion dated Jul. 7, 2016, for International Patent Application No. PCT/US2016/025924, 10 pages.

Machine Translation of DE 3627201; Retrieved May 23, 2019 (Year: 2019).

Restriction Requirement dated May 31, 2019 of U.S. Appl. No. 15/564,424 by Tansley, I., filed Oct. 4, 2017.

Non-Final Office Action dated Oct. 24, 2019 of U.S. Appl. No. 15/564,424 by Tansley, I., filed Oct. 4, 2017.

Notice of Allowance dated May 4, 2020 of U.S. Appl. No. 15/564,424 by Tansley, I., filed Oct. 4, 2017.

Supplemental Notice of Allowability dated Jun. 4, 2020 of U.S. Appl. No. 15/564,424 by Tansley, I., filed Oct. 4, 2017.

* cited by examiner

MOBILE REFRIGERATION APPARATUS

CROSS REFERENCE TO RELATED APPLICATIONS

This application is a continuation of U.S. patent application Ser. No. 15/564,424, filed Oct. 4, 2017, which is a National Stage Entry of PCT/US2016/025924, filed Apr. 4, 2016, which claims priorities to U.S. Provisional Patent Application No. 62/143,662 filed on Apr. 6, 2015, U.S. Provisional Patent Application No. 62/151,318 filed on Apr. 22, 2015, and U.S. Provisional Patent Application No. 62/151,322 filed on Apr. 22, 2015, the contents of all of which are expressly incorporated by reference herein.

FIELD OF THE INVENTION

The present invention relates to a refrigeration apparatus. In particularly, but not exclusively, the invention relates to a refrigeration apparatus for use in storing and transporting vaccines, perishable food items, packaged beverages or the like, and for the cooling or temperature control of equipment such as batteries, in the absence of a reliable supply of electricity. Aspects of the invention relate to an apparatus and to a method.

BACKGROUND

A large proportion of the world's population does not have access to a consistent and reliable supply of mains electricity. The storage of vaccines, food items and beverages at appropriate temperatures is difficult in such areas where this absence of a constant and/or reliable supply of electrical power restricts the widespread use of conventional refrigeration equipment. Further, shipping these items while cooled and with minimal access to electricity poses additional complications.

The applicants have identified improved apparatus to facilitate packaging, transportation and efficiency in some applications. It is against this background that the present invention has been conceived. Other aims and advantages of the invention will become apparent from the following description, claims and drawings.

INCORPORATION BY REFERENCE

U.S. patent application Ser. No. 13/383,118 (Inventors: Tansley, et al.; filed on Jul. 9, 2010), titled "Refrigeration Apparatus," U.S. patent application Ser. No. 14/373,580 (inventors: Tansley, et al.; filed on Jan. 28, 2013), titled "Refrigeration Apparatus," European Patent Application No. 1416879.3 (inventors: Tansley, et al.; filed Sep. 24, 2014), titled "Cooling Apparatus and Method," and "Polyethylene Nanofibers with very High Thermal Conductivities" by A. Henry, et al. published in Nature Nanotechnology on Mar. 7, 2010 are hereby incorporated by reference in their entirety and for all purposes to the same extent as if the patent application was specifically reprinted in this specification.

SUMMARY

Embodiments include a mobile refrigeration apparatus. The mobile refrigeration apparatus comprising a thermally conductive spherical shell contained within an insulated container and substantially full of water. Suspended in the center of the thermally conductive spherical shell is a cooling element that generates ice from the water contained within the thermally conductive shell. A thermally insulating cup is housed within the thermally conductive spherical shell and contains the cooling element. The thermally insulating cup is configured to always orient upright despite the orientation of the insulated container and enabled for the water contained within the thermally conductive shell to pass in and out of the thermally insulating cup.

Certain embodiments provide for orienting the thermally insulating cup by using a gimbal. Other embodiments make use of a thermally insulating cup rotatably mounted about a bar which rotatably mounts to the insulated container. Still other embodiments provide for use of a modified thermally insulating cup

DETAILED DESCRIPTION

A refrigeration unit designed for prolonged cooling with intermittent power supplies and adaptability to rotation is described. A spherical design is utilized comprising internal compartments that shift according to orientation of the sphere and enable internal cycling of water at substantially 4 degrees Celsius about an icy core. The refrigerator may be used for the cold storage and transportation of vaccines without freezing the contents of said vaccines.

For purposes of this disclosure, the term "cup" refers to an object which contains fluids and is not entirely sealed.

Figure 2:
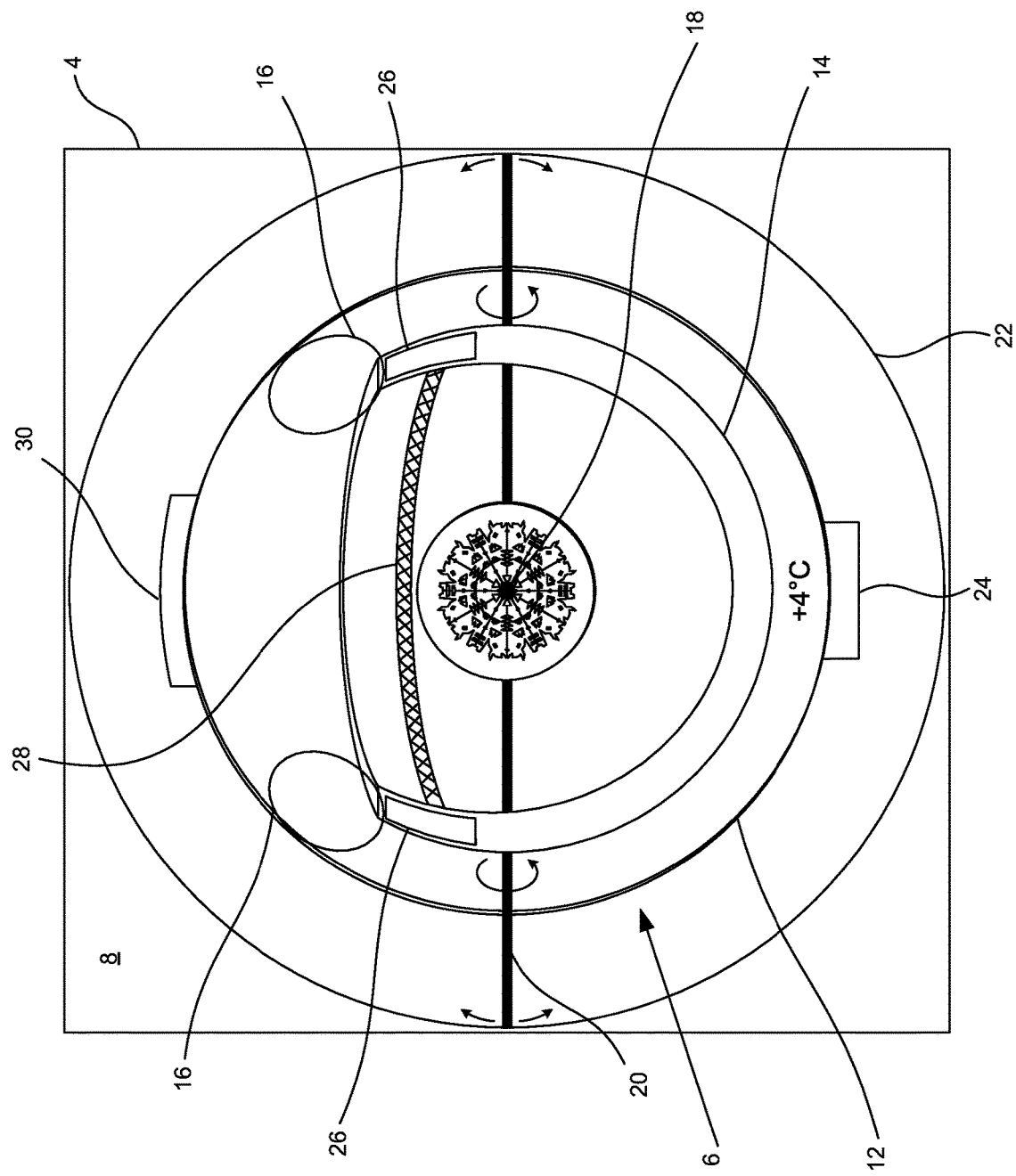
FIG. 2 is a cut away illustration of a mobile refrigeration unit using a powered rotation bar.

With reference to FIG. 2 of the '580 application of the incorporated art, a weir means of temperature regulation was taught. The '580 application taught the use of two fluid reservoirs separated by a thermally insulated dividing wall. One of these reservoirs contained a refrigeration unit which generated an icy core. The reservoirs were joined by an open slot which created a mixing region where water which was substantially 4 degrees Celsius cycled between the two regions. The apparatus disclosed in the '580 application is useful; however, when turned on a side, the mixing region ceases to function properly. Due this orientation issue, shipping the apparatus in a functional state is problematic.

Figure 1A:
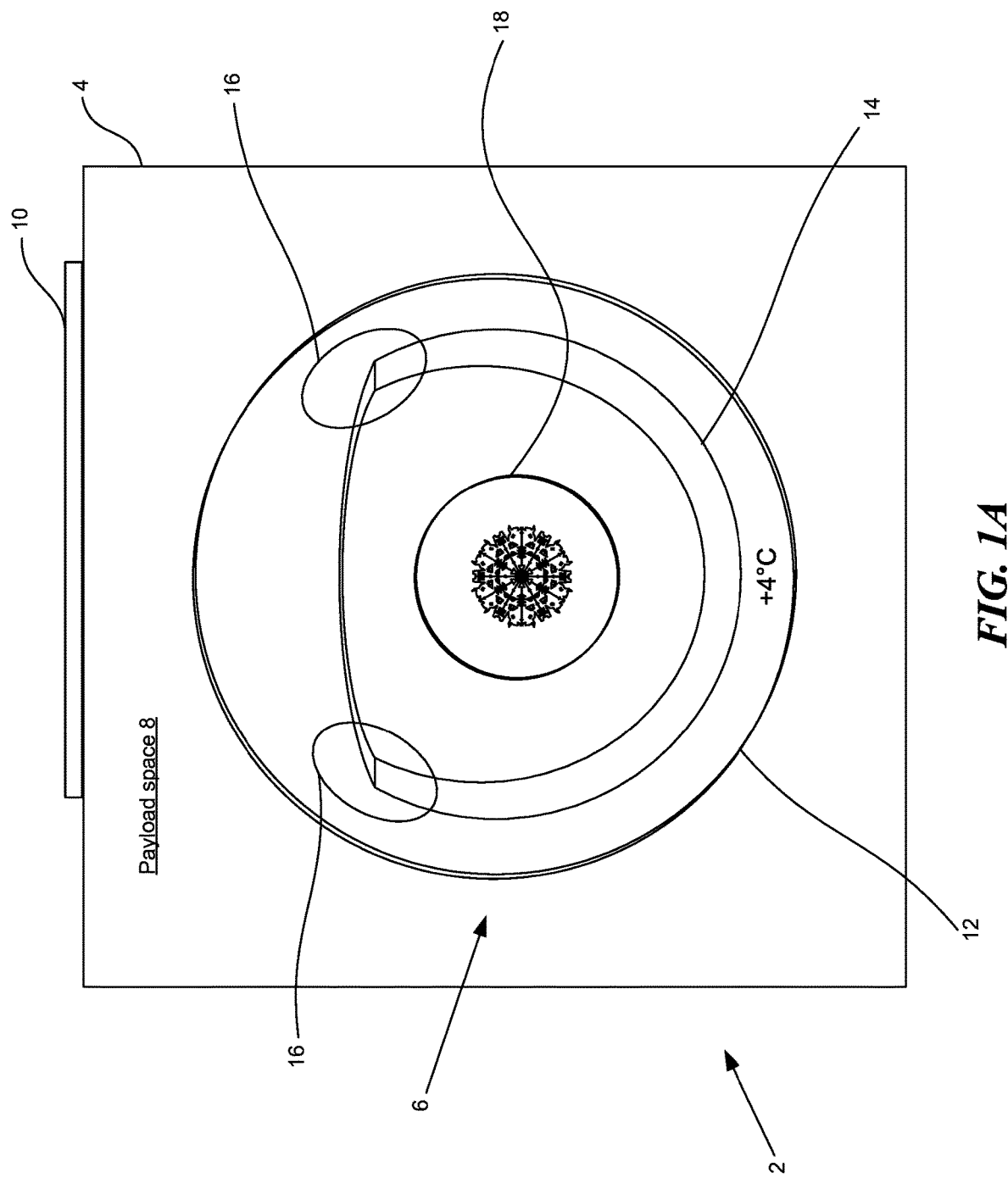
FIG. 1A is a cut away illustration of a mobile refrigeration unit.

FIG. 1A is a cut away illustration of a mobile refrigeration apparatus 2. The apparatus 2 comprises an insulated container 4 and a spherical cooling globe 6. The insulated container 4 comprises suitable thermal insulation for shipping temperature sensitive items, a payload space 8 to store items, and an access door 10. Volume inside the insulated container 4 is dedicated to spherical cooling globe 6, physical support of the spherical cooling globe (not shown), payload space 8, and support of payload items (not shown). In certain embodiments, refrigeration apparatus is affixed to the insulated container, but stored outside of the internal volume of the insulated container.

The spherical cooling globe 6 comprises a thermally conductive shell ("shell") 12 substantially full of water. The extent to which the spherical cooling globe 6 is full or water is dependent on the amount of ice contained within the shell 12. Inside the shell 12, there is a suspended insulating cup ("cup") 14. The cup 14 separates two reservoirs of water inside the shell 12: the water inside the cup, and the water outside of the cup. Where the two reservoirs meet, there are mixing regions 16. Inside the cup, is a cooling element 18. The cooling element 18, when powered cools the water within the shell and in the immediate vicinity of the cooling element 18, an icy core forms.

The water inside the cooling globe 6 does not necessarily need to be pure, or even necessarily water. The important characteristic have having a fluid material having a critical temperature at which the density of the fluid is the greatest, such that when the fluid is above or below that temperature, the fluid is less dense. In the case of pure water, this temperature is four degrees Celsius. Colder or warmer water is less dense than water at 4 degrees Celsius.

In operation, water that is four degrees Celsius will come to rest outside of the cup 14. When that water warms, the warmer water will rise up in the shell 12 and enter the mixing zones 16. Water in the cup will be cooler due to the presence of the cooling element 18. The warmer water rising from the four-degree reservoir will cool in the mixing zone and sink once reaching four degrees again into the cup 14. Once in the cup 14, the water will cool further from four degrees, and rise again back into the mixing zone 16. This effect causes the water outside of the cup 14 and in contact with the shell 12 to substantially maintain a temperature of 4 degrees Celsius. When the spherical cooling globe 6 is rotated or rolled to another orientation, the cup 14 inside the shell 12 re-orients so the mixing zones 16 are maintained.

The cooling element 18 takes various embodiments. In a thermoelectric cooling embodiment the cooling element 18 comprises a cooling plate, and a heating plate resides outside of the insulated container 4. In some embodiments the cooling element 18 provides cooling with a refrigerant pumped therethrough by means of a pump and refrigeration apparatus external to the insulated container 4. In some embodiments, the cooling element 18 is operated by refrigerant that has been cooled by expansion of compressed refrigerant in the manner of a conventional vapor-compression refrigeration cycle additionally external to the container.

Figure 1B:
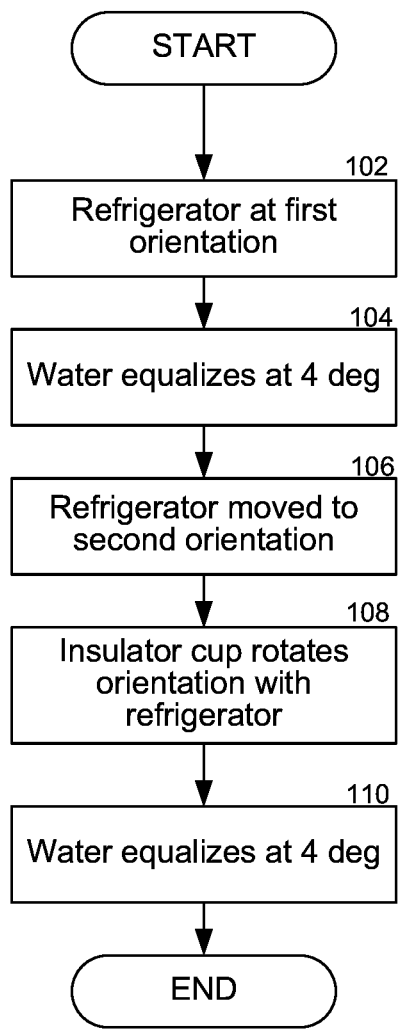
FIG. 1B is a flowchart of operation of a functionally orientation agnostic refrigerator.

FIG. 1B is a flowchart of operation of a functionally orientation agnostic refrigerator. In step 102, the mobile refrigeration apparatus 2 is oriented in a first position. In step 104, the water inside the shell 12 equalizes at approximately four degrees Celsius. Based on the construction of the cooling globe 6, water warming from four degrees rises to meet colder water which is falling as the cooler water warms to four degrees. Rising water in the mixing zone cools down and sinks towards the cooling element 18. Water by the cooling element 18 cools and returns to the mixing zone.

In step 106, the mobile refrigeration apparatus 2 is reoriented. In step 108, the insulator cup 14 re-orients with the mobile refrigeration apparatus 2. The reorienting occurs based on design implementations which make use of weights, buoyant materials, or balance mechanisms to automatically re-orient. In step 110, the cooling globe 6 continues to equalize temperature at four degrees.

FIG. 2 is a cut away illustration of an embodiment of a mobile refrigeration unit using a powered rotation bar 20. Embodiments include spherical cooling globe 6 rotatably mounted on a powered rotation bar ("bar") 20. The bar 20 is further rotatably mounted to a powered rail ("rail") 22 outside of the spherical cooling apparatus and inside the container.

The bar 20 provides power and/or refrigerant delivery and removal to and from the cooling element 18. Where the bar 20 contacts the rail, additional tubing or heat exchanging apparatus is concealed. Certain embodiments are configured where the cooling element 18 functions only in a single, predetermined orientation or the bar 20 within the rail 22. Other, more expensive, embodiments include functional cooling at all orientations. Certain embodiments of bar 20 and rail 22 interface are designed such that the bar is affixed as a spoke in a wheel, and the wheel rotates within the rail 22 to provide an improved seal for concealing heat exchanging apparatus. The bar 20 and rail 22 are thermally insulated.

The cooling element 18 is mounted centrally on the bar 20 and optionally includes an ice growth sensor (not shown) mounted perpendicularly to the bar 20. The ice growth sensor instructs the cooling element 18 to cease function when ice freezes over the ice growth sensor. The ice growth sensor improves power efficiency of the spherical cooling globe 6 and additionally prevents ice from contacting the cup 14.

The spherical cooling globe 6 has an additional weight 24 mounted at the base of the shell so when the container 4 is rotated on the axis of the rail 22, the spherical cooling globe 6 rotates to maintain orientation of the cup 14 and cooling element 18. Items in the payload space 8 are contained in wall mounted satchels or cages to prevent creating friction with or physically blocking the bar 20 and spherical cooling globe 6.

Inside the spherical cooling globe 6, the cup 14 is rotatably mounted on the bar 20. At the top rim of the cup 14 is made of buoyant material 26. When the container 4 is rotated in the axis perpendicular to the rail 22, the cup 14 rotates about the bar 20 and the buoyant upper rim 26 remains upright.

Additionally affixed to the inside of the cup 14 is mesh netting 28. The mesh netting 28 acts as a collector for broken or split chunks of the icy core. If the container 4 is dropped, and the icy core cracks or splits and chunks of ice fall off, the netting keeps the chunks of ice inside the cup 14 rather than allow the chunks of ice to float out of the cup 14 thereby causing harm to the cooling mechanism of the cooling globe 6.

The shell 12 has a hatch 30 enabling the shell 12 to fill with water.

Figure 3:
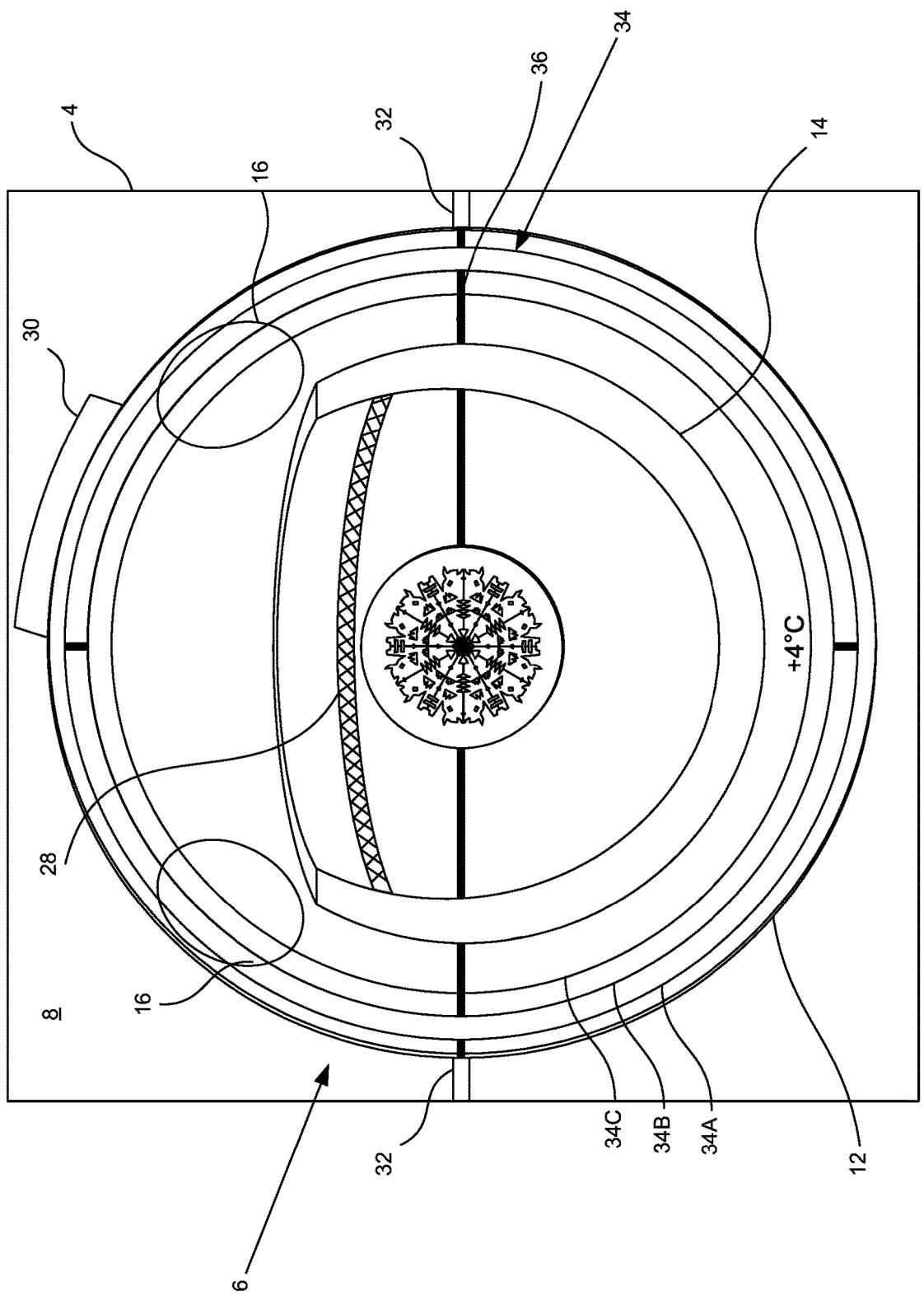
FIG. 3 is a cut away illustration of a mobile refrigeration unit using a gimbal.

FIG. 3 is a cut away illustration of an embodiment of a mobile refrigeration unit using a gimbal. Embodiments of the invention include spherical cooling globe 6 mounted inside an insulated container 4 via struts 32. Inside the spherical cooling apparatus, a three-axis gimbal 34 ensures the cup 14 remains upright despite the orientation of the insulated container 4.

Gimbal embodiments of the invention do not require that items contained in the payload 8 space refrain from contact with the shell 12. Rotation is conducted inside the shell 12. Gimbal axes 34A-C are aerodynamic so as to prevent drag with water within the shell 12. Gimbal axes 34A-C, mounting arms 36, and struts are thermally insulated and provide a space to conceal power cabling and/or heat exchanging apparatus.

When the insulated container 4 is reoriented, the first two gimbal axes 34A-B rotate to compensate, and the third gimbal axis 34C which the cup 14 is affixed to remains stationary and upright.

The cooling element 18 is affixed inside the cup 14 at the center of the spherical cooling globe 6. The cooling element 18 optionally includes an ice growth sensor mounted radially from the center of sphere of ice.

Gimbal 34 embodiments include other compatible components of bar 20 embodiments.

Figure 4A:
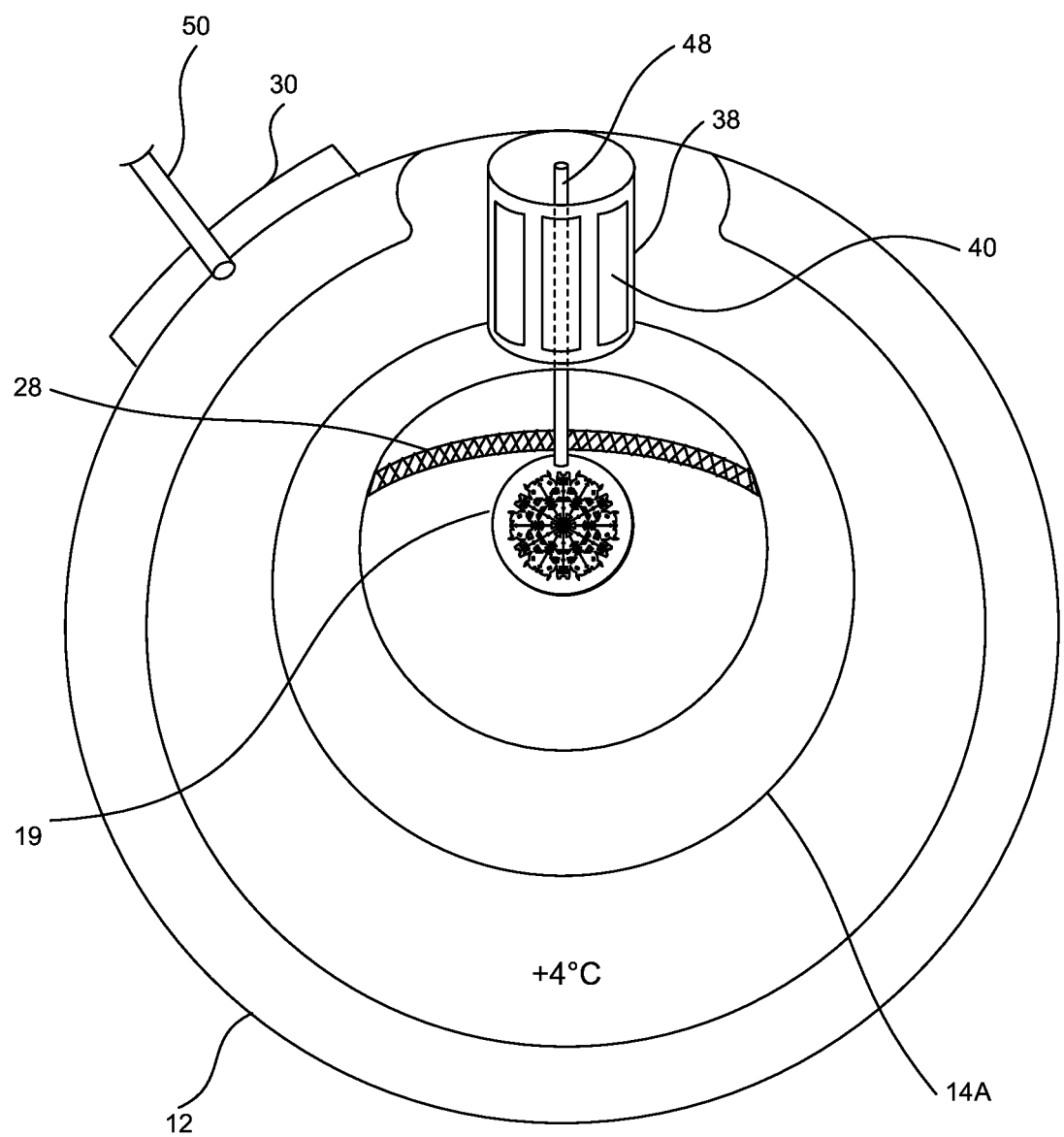
FIG. 4A is a cut away illustration of a mobile refrigeration unit using a free floating icy core.
Figure 4B:
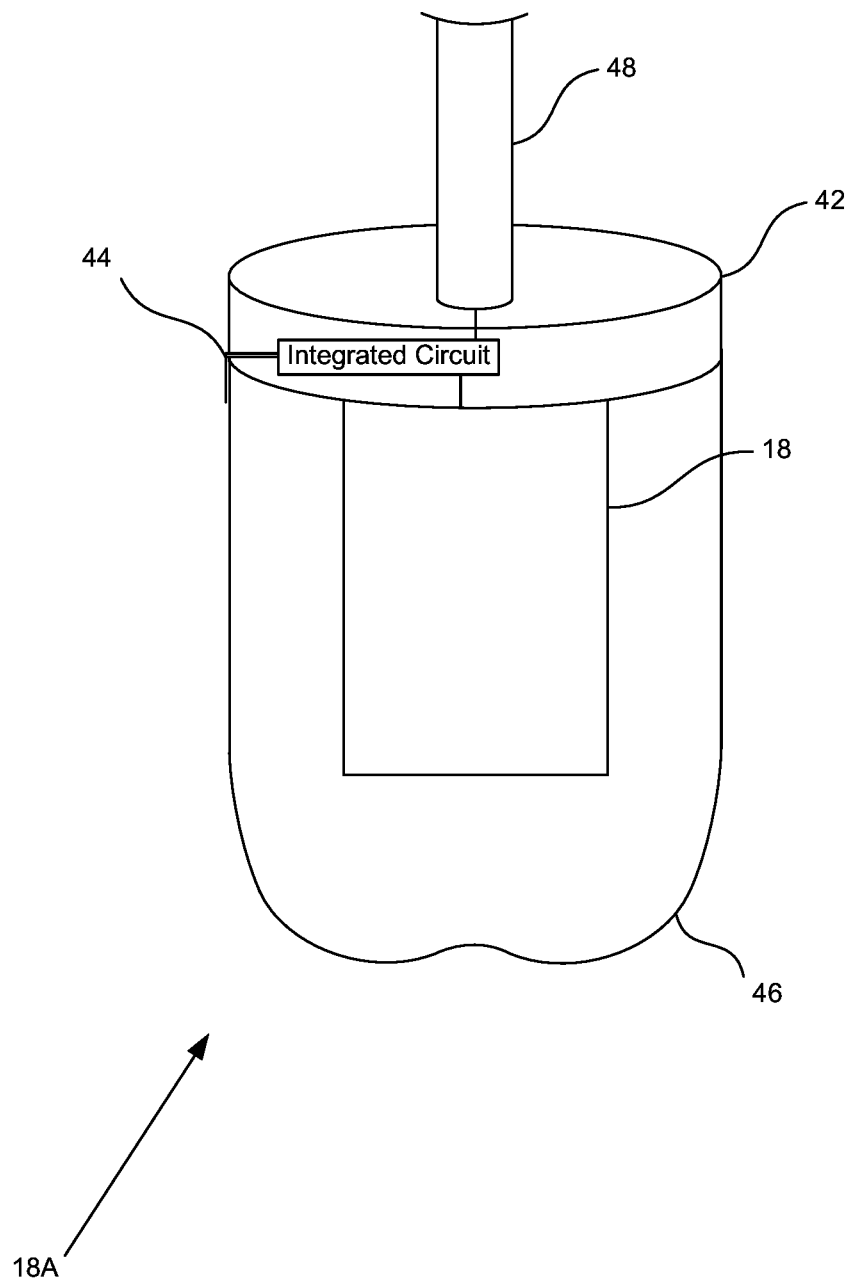
FIG. 4B is a close up of a floating icy core.

FIG. 4A is a cut away illustration of a mobile refrigeration unit 2 using a free floating icy core 19 and FIG. 4B is a close up of a free floating icy core 19. Embodiments of include a cup 14A and an icy core 19 which are free floating inside the water contained within the shell 12.

The free floating cup 14A is shaped in a largely spherical manner with a buoyant spout 38 mounted on top. The spout 38 on the free floating cup 14A is made of buoyant material. Regardless of the orientation of the shell 12, the spout 38 of the free floating cup 14A will orient upwards and abut against the inner side of the shell 12. The spout 38 includes mixing vents 40. The mixing vents 40 provide for an interface between the water reservoir inside the free floating cup 14A and the water reservoir outside of the free floating cup 14A despite that the spout 38 abuts against the inner surface of the shell 12.

The free floating icy core 19 comprises a buoyant disc and a heavy cooling element. The buoyant disc 42 is made from a material less dense than ice. The buoyant disc 42 will remain upright and abut the netting 28 affixed inside the cup 14A. The buoyant disc 42 is insulating and provides for a spacer between the cooling element 18 and the netting 28 so that ice does not form entangled with or above the netting 28.

Additionally an ice growth sensor 44 is mounted at the edge of the buoyant disc 42 to prevent the function of the cooling element 18 once ice 46 has forced out to the edge of the buoyant disc 42. A refrigeration pipe 48 extends upward from the buoyant disc 42 to conceal heat exchanging apparatus. The refrigeration pipe 48 is additionally threaded through the netting 28 and is directed out of the free floating cup 14A through the spout 38.

The shell 12 in free floating embodiments additionally comprises a refrigeration connector 50. In certain embodiments, the refrigeration connector 50 is affixed to the hatch 30 on the shell 12, though other embodiments the refrigeration pipe 50 is affixed in another location on the surface of the shell 12. The refrigeration pipe 48 is preferably flexible so as to not impede the rotation of the shell 12 inside the insulated container 4.

When a user intends for the cooling element 18 to operate and generate ice 46, the insulated container 4 and shell 12 are oriented upright and the refrigeration pipe 48 and the refrigeration connector 50 match up. When the refrigeration pipe 48 and connector 50 match up, heat exchanging apparatus is functional.

Still other embodiments do not include the use of a cooling element 18. Such embodiments are pre-prepared with pre-made blocks of ice 46, filled with cool water, and sealed. Optionally, embodiments of the cooling globe 6 which do not use a cooling element 18 are designed smaller and used in large quantities to more effectively use volume inside the insulated container. The effect is similar to that of filling the payload space with ice cubes (or spheres), but the outer surface of each sphere remains at four degrees Celsius rather than zero or below.

Figure 5:
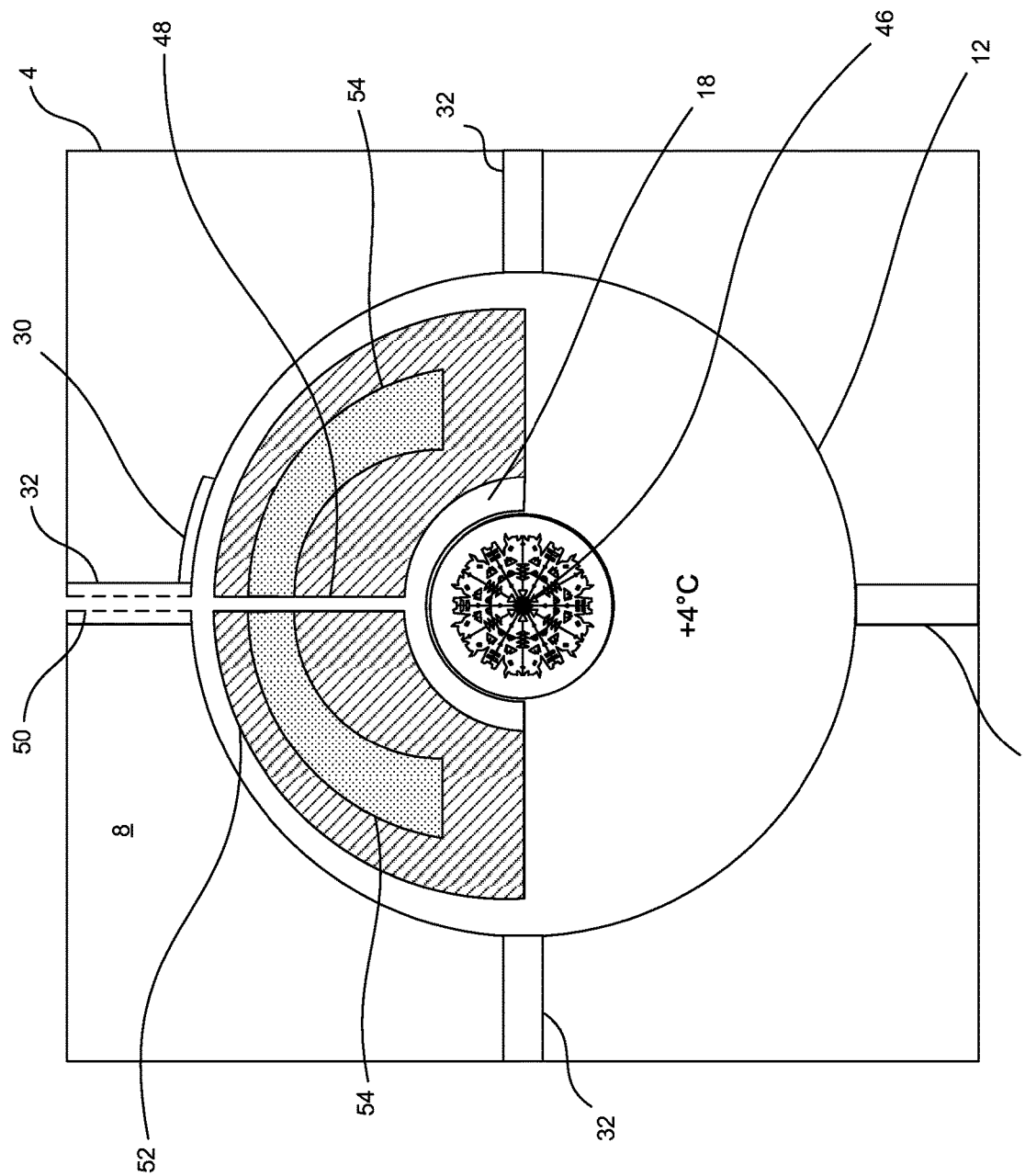
FIG. 5 is a cut away illustration of a mobile refrigeration unit with a buoyant hemisphere.

FIG. 5 is a cut away illustration of a mobile refrigeration unit with a buoyant hemisphere 52. Embodiments of the invention include a shell 12 containing an insulating and buoyant hemisphere 52. The shell 12 is supported in the insulated container 4 by struts 32. Inside the shell 12 is an insulating hemisphere 52. The rest of the volume of the shell 12 is substantially full of water. The insulating hemisphere 52 contains buoyant material 54 on the outer region of the hemisphere 52. The buoyant material 54 is less dense than ice.

Accordingly, the insulating hemisphere 52 will always float to settle at the upper hemisphere of the shell 12 regardless of the orientation of the insulated container 4 or the shell 12. The water in the shell 12 remains in contact with the lower hemisphere of the shell and absorbs heat from the payload space while the upper hemisphere of the shell 12 is comparatively thermally inert.

On the underside of the insulating hemisphere 52 is a cavity with a cooling element 18. The cooling element 18, when active, generates ice 46 from the water contained within the shell 12. In use, water by the ice 46 will be close to zero degrees, while denser water closer to four degrees will sink to the bottom of the lower hemisphere of the shell 12. As the water warms from four degrees, the water rises and comes into contact with cooler water by the ice 46, cools down again, and returns to the bottom of the lower hemisphere of the shell 12.

The cooling element 18 is affixed to a refrigeration pipe 48 which is embedded through the center of the insulating hemisphere 52. The refrigeration pipe contains heat exchanging apparatus. During cooling operation, the insulated container 4 is placed in the appropriate orientation for the refrigeration pipe 48 to match up with a refrigeration connection 50 concealed internally within a strut. The refrigeration connection enables heat exchanging apparatus outside the volume of the insulated container to use the cooling element 18 inside the shell 12.

In another smaller and simpler embodiment of the invention illustrated in FIG. 5, a plurality of small, thermally conducting shells 12 including buoyant insulating hemispheres 52 comprise a significant portion of the volume of the insulated container 4. The buoyant insulating hemispheres 52 include a cavity on the underside of the hemisphere for insertion of a block of ice 46. The remainder of the volume of the shell is substantially filled with water.

In comparison to FIG. 5, the smaller and simple embodiment is the same, without the cooling element 18, the refrigeration pipe 48, the refrigeration connection 50, and the struts 32. The cooling scheme occurs in precisely the same manner. The effect is similar to that of filling the payload space with ice cubes (or spheres), but the outer surface of each sphere remains at four degrees Celsius rather than zero or below.

Figure 6:
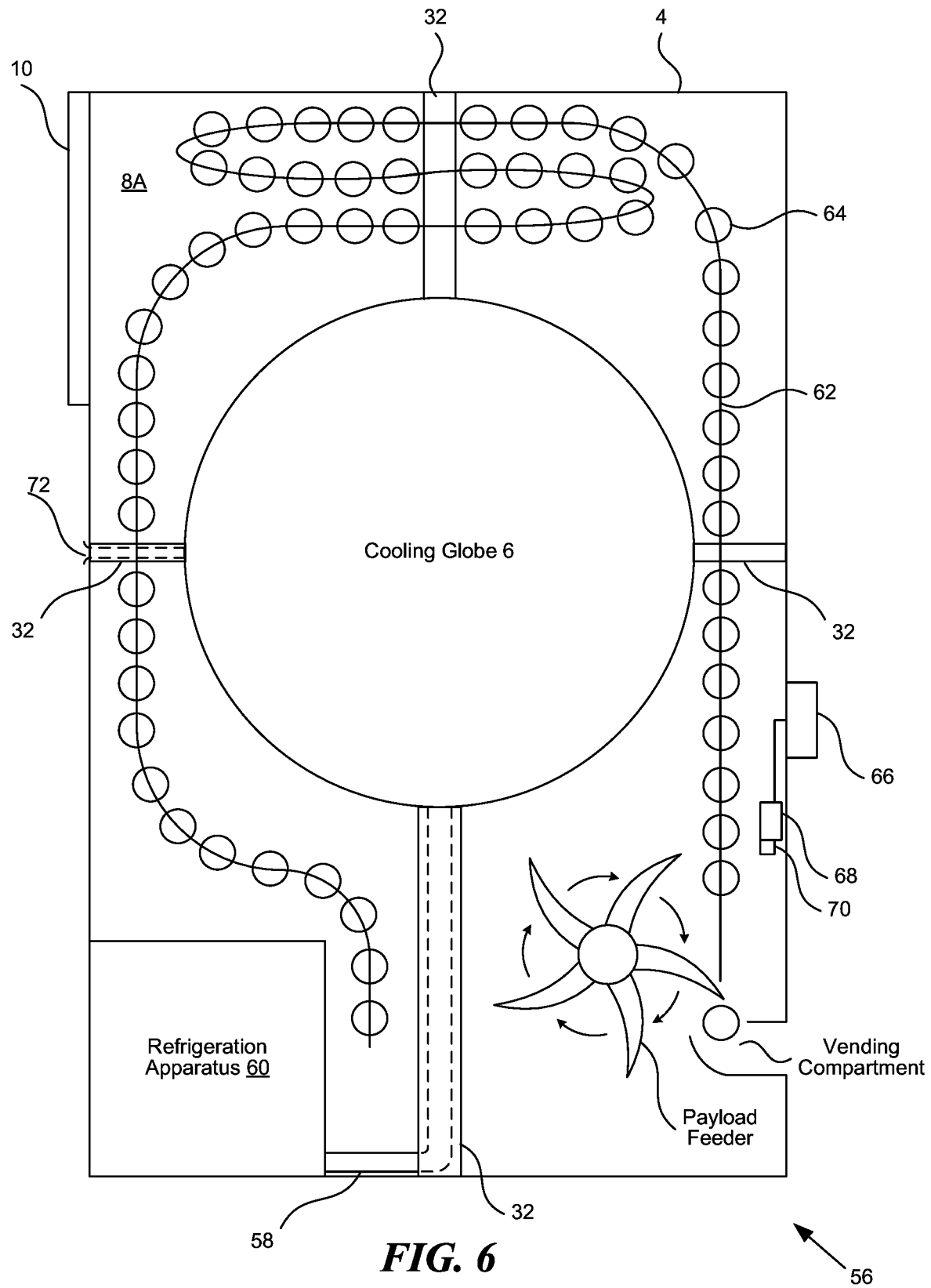
FIG. 6 is a cut away illustration of a shippable refrigerated vending machine.

FIG. 6 is a cut away illustration of a shippable refrigerated vending machine 56. The shippable refrigerated vending machine 56 is designed to reduce human involvement in the distribution of refrigerated goods, especially vaccines. The refrigerated vending machine 56 is designed with a spherical cooling globe 6. The cooling globe 6 maintains a temperature of substantially four degrees Celsius for prolonged periods of time, measured in days, without power and regardless of the orientation of the cooling globe 6.

The cooling globe 6 may be constructed similarly to above disclosed cooling globe 6 embodiments. In some embodiments, the refrigerated vending machine 56 uses a plurality of small cooling globes 6 which maintain the temperature of four degrees Celsius for a prolonged period of time without power and regardless of orientation.

The cooling globe(s) 6 is housed within a vending machine containment 8A. The vending machine containment 8A comprises an insulated container 4. Support struts 32 maintain positioning of the cooling globe 6 and conceal heat exchanging apparatus 58 between the cooling globe 6 and refrigeration apparatus 60. When set up for operation, the refrigeration apparatus 60 is plugged in and provides power as necessary to a cooling element (not shown) housed within the cooling globe 18.

Before use, one or more payload belts 62 or cartridges are wrapped around the cooling globe 6. The payload belts 62 are inserted through a hatch 10 on the insulated container 4. The hatch 10 is sealed before use and/or shipping.

Upon arriving at a destination, the refrigerated vending machine is set up and customers make selections which are delivered to a vending compartment by a payload feeder. Selection of payload is determined by suitable known vending selection apparatus.

In some embodiments, selection of payload 64 such as medication and vaccines is determined through a biometric scanner 66. The biometric scanner 66 governed by a logic circuit 68 and a memory 70 storing records and instructions. The biometric scanner 66 either determines the identity of a customer through biometric identification such as a fingerprint, retinal, or other suitable biometric identification or performs a need based scan. Needs based scans comprise blood tests or other suitable quickly performed biometric tests. As an illustrative example, a refrigerated vending machine having a payload 64 of insulin performs a blood sugar test on customers.

The vending machine 56 goes through several phases. First the vending machine is constructed, the payload 64 is inserted, and the cooling globe 6 is made functional. Then the vending machine 56 is sealed up, and with minimal packaging, shipped to a destination. Depending on the destination and means of shipping, optionally the vending machine 56 is supplied additional power somewhere en-route to refresh the cooling capability of the cooling globe 6. Upon arrival at the destination, the vending machine 56 is oriented upright, and provided whatever power source is available at the destination. Customers then have access to the vending machine 56. When the payload 64 is spent, the vending machine 56 is either refilled, or the cooling globe 6 is drained of water and the vending machine 56 is shipped back to the origin point and refilled.

In certain embodiments, an inlet and outlet vent 72 which fills and empties the cooling globe 6 of water is concealed within a strut 32. The inlet and outlet vent 72 enables water to be added and removed without opening the container 4.

In some embodiments, a cooling globe 6 is not used. Rather a simpler water-based cooling means described in the incorporated references are used with a payload cartridge 64 or payload belt 62 and the vending machine 56 is not configured to be shipped as an active cooling unit.

Certain embodiments of the invention are constructed with easily strip away components. The components of the invention are broken down after delivery of payload items 64 is achieved. The broken down components are more easily packed and return shipped.

Certain embodiments of the invention use components made from compostable parts. Embodiments of compostable parts include seeds that are planted during the composting process.

Certain embodiments of the invention use recyclable components such as thermally conductive plastics and regularly insulating plastics.

Certain embodiments of the invention use a combination of reusable, recyclable and compostable components. After use, some components are broken down and shipped back to the point of origin, some components are sent to a recycling plant, and some components are left to degrade naturally.

Figure 7:
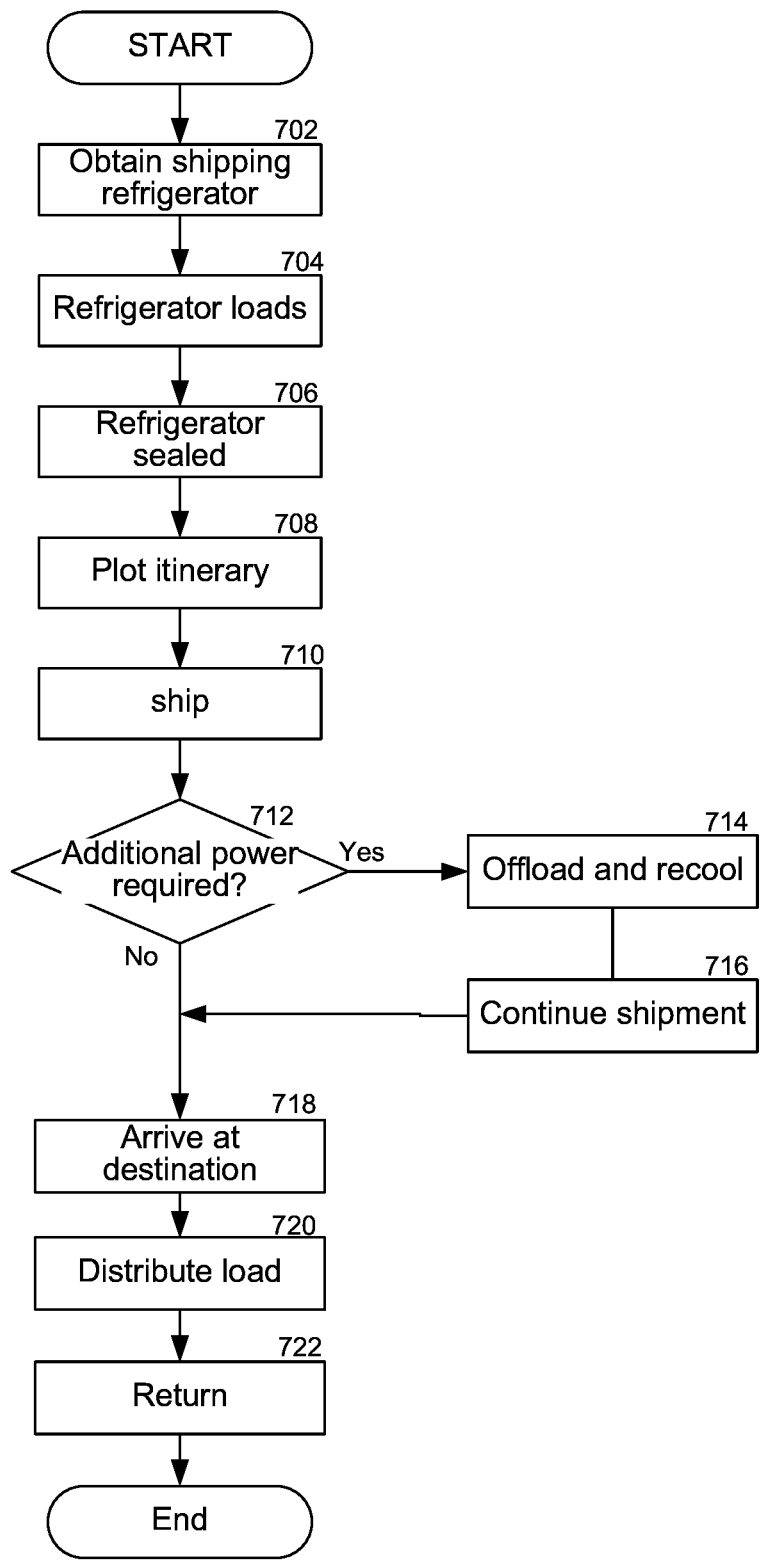
FIG. 7 is a flow chart illustrating a method of refrigerator shipping.

FIG. 7 is a flow chart illustrating a method of refrigerator shipping. In step 702, a supplier obtains a shipping refrigerator. The shipping refrigerator is preferably water cooled. In some embodiments, mobile refrigerators as described above used. In other embodiments, refrigerators disclosed in incorporated art are used. In still other embodiments any other suitable refrigerator capable of being shipped is used.

Once the refrigerator is chosen, in step 704, a payload is added. In step 706, the payload is sealed in the refrigerator for shipment. In step 708, an itinerary comprising a destination along with a means or path to arrive at said destination is chosen. Known and common shipping and freight methods are all acceptable. In step 710, the refrigerator is then shipped.

When an itinerary calls for a particularly long shipping journey, the refrigerator will require additional power to re-cool. In step 712, when the refrigerator requires additional power, a note in the itinerary is added. In step 714, such notation instructs shipping personnel of appropriate action to re-chill the refrigerator. Time to complete the re-chilling of the refrigerator is planned into the itinerary. In step 716, once the refrigerator is re-chilled, the shipping process continues.

In step 718, the refrigerator arrives at the intended destination. In step 720, once at the destination, the refrigerator payload is distributed to customers or clients. Such customers or clients comprise either consumers for chilled goods, doctors whom provide vaccines to patients, or patients themselves. In step 722, once the refrigerator has completed distribution, unnecessary parts and weight is removed and the refrigerator is return shipped for additional use.

As an illustrative example, where a refrigerator must be shipped by boat or vessel across the Pacific ocean, there is risk that the temperature inside the refrigerator will rise to an unacceptable level. When the risk is perceived to be too high, additional power is required to generate more ice in the water cooled refrigerator.

Figure 8:
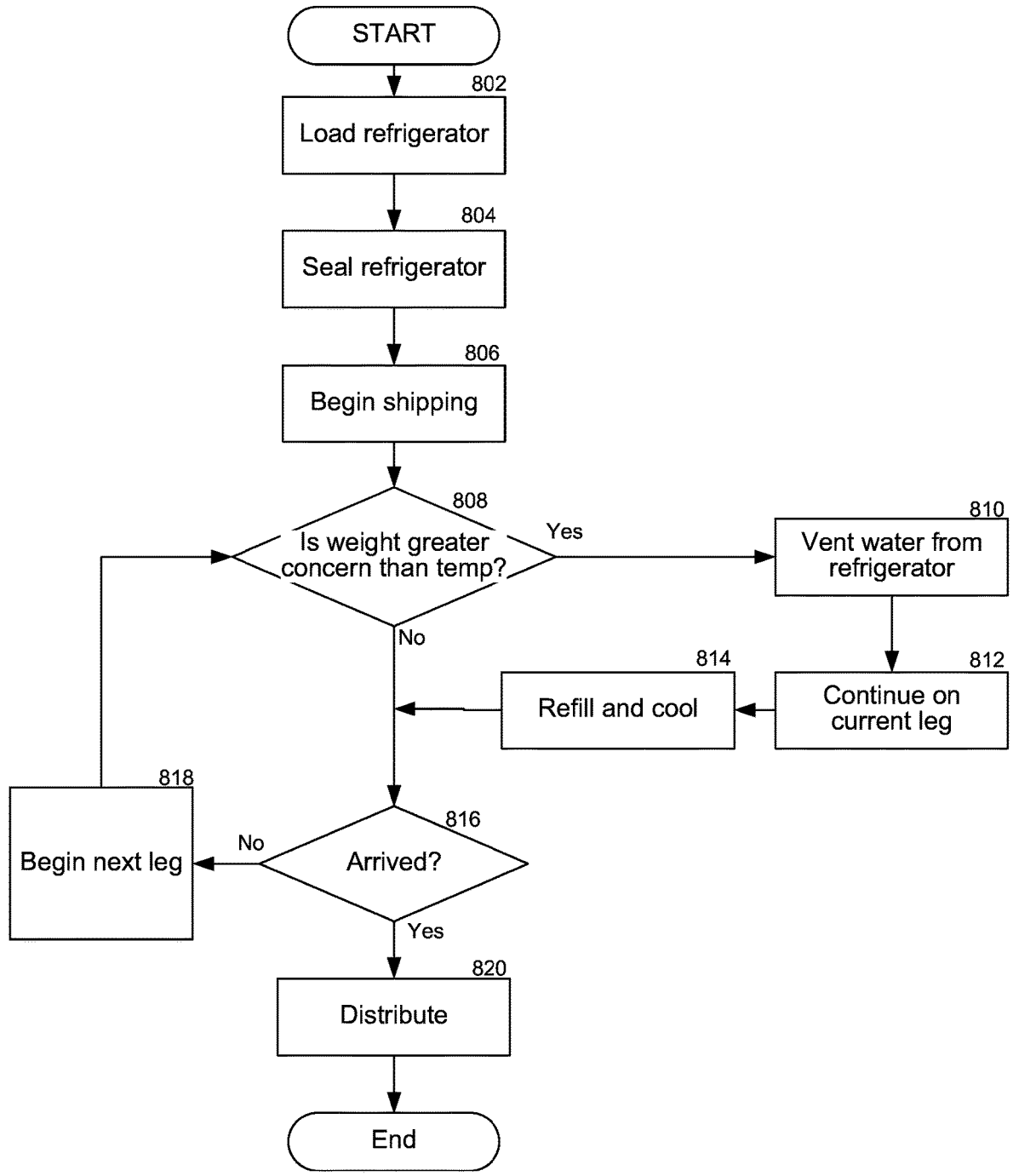
FIG. 8 is a flow chart illustrating a method for venting a refrigerator shipping container.

FIG. 8 is a flow chart illustrating a method for venting a refrigerator shipping container. In steps 802-806, Similarly to the method taught in FIG. 7, first a refrigerator is loaded and sealed for transit, then shipped.

A given itinerary to ship a refrigerator has multiple legs or segments of shipping. Each leg uses a different mode of transit such as train, plane, and ship. In step 808, when a mode of transit provides a temperature controlled environment, and weight is a greater concern than temperature, in step 810, shipping personnel vent the water from the refrigerator thereby significantly reducing the weight of the refrigerator through the inlet/outlet vent as pictured in FIG. 6.

Once the leg where temperature is controlled and weight is a concern is ended, In step 814, the refrigerator is refilled with water and the necessary amount of water is refrozen. If there are remaining legs the determination of step 808, if the refrigerator is too heavy, is made again until the refrigerator arrives at the destination. In step 820, then the payload is distributed.

As an illustrative example, planes sometimes have refrigerated compartments, but a heavier plane requires a noticeable amount of additional fuel. Water would be vented to accommodate this circumstance.

Figure 9:
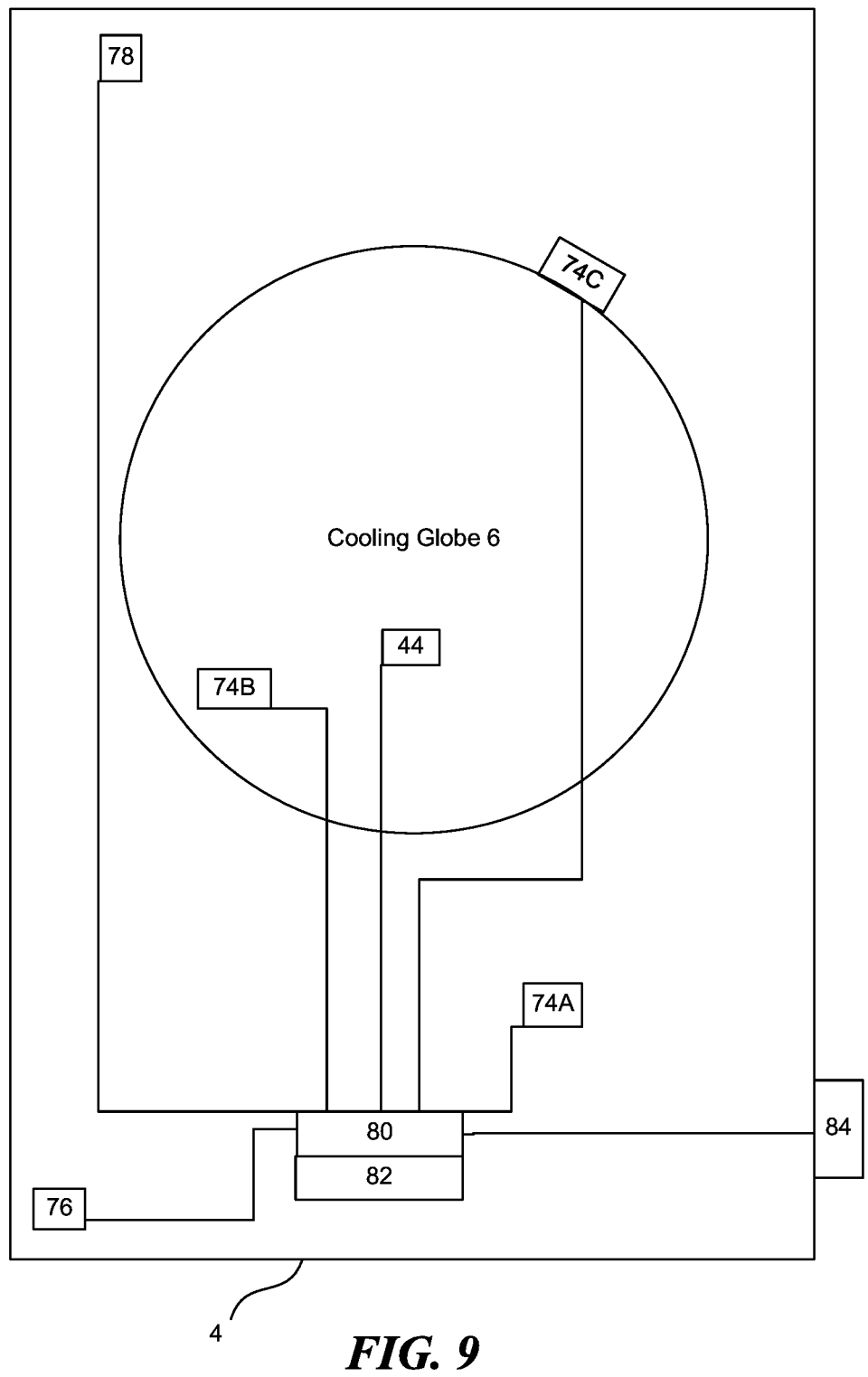
FIG. 9 is a cut away diagram of a plurality of sensors associated with refrigerated shipping containers.

FIG. 9 is a cut away diagram of a plurality of sensors associated with refrigerated shipping containers. A refrigerated container's sensors comprise a thermometer both in the payload space of the refrigerator 74A and a thermometer inside the cooling globe 74B. These thermometers 74 record differences in cooling potential and provide data to perform analytics on. As an alternative to a thermometer inside the refrigeration apparatus, a thermometer is placed on the surface of the refrigeration apparatus 74C.

In addition to the thermometers 74, the refrigerated container 4 additionally includes a humidity 76 sensor and a gyroscope 78. The gyroscope reports the orientation of the container 4. The humidity sensor 76 reports the water content of the air inside the container 4.

All of these sensors report data to a control chip 80. The control chip 80 in turn reports the sensor information to an outside server by use of a wireless communicator 82. The server (not shown) provides information to shipping personnel. In some embodiments the control chip 80 reports the data to a surface mounted label 84. The label 84 comprises a digital display or a scannable code. In embodiments where the control chip 80 does not report data to the label 84, the label 84 is simply a static identification for the container 4.

The combination of these sensors create warnings when certain thresholds or gradients are met. Thresholds include specific readings, or a change in readings at a specific rate. There are also multiple thresholds to indicate differing levels of severity. Different levels of severity include suggested potential causes associated with the given threshold. A particularly severe threshold warning would suggest that the container was breached, or the refrigeration apparatus had failed.

Figure 10:
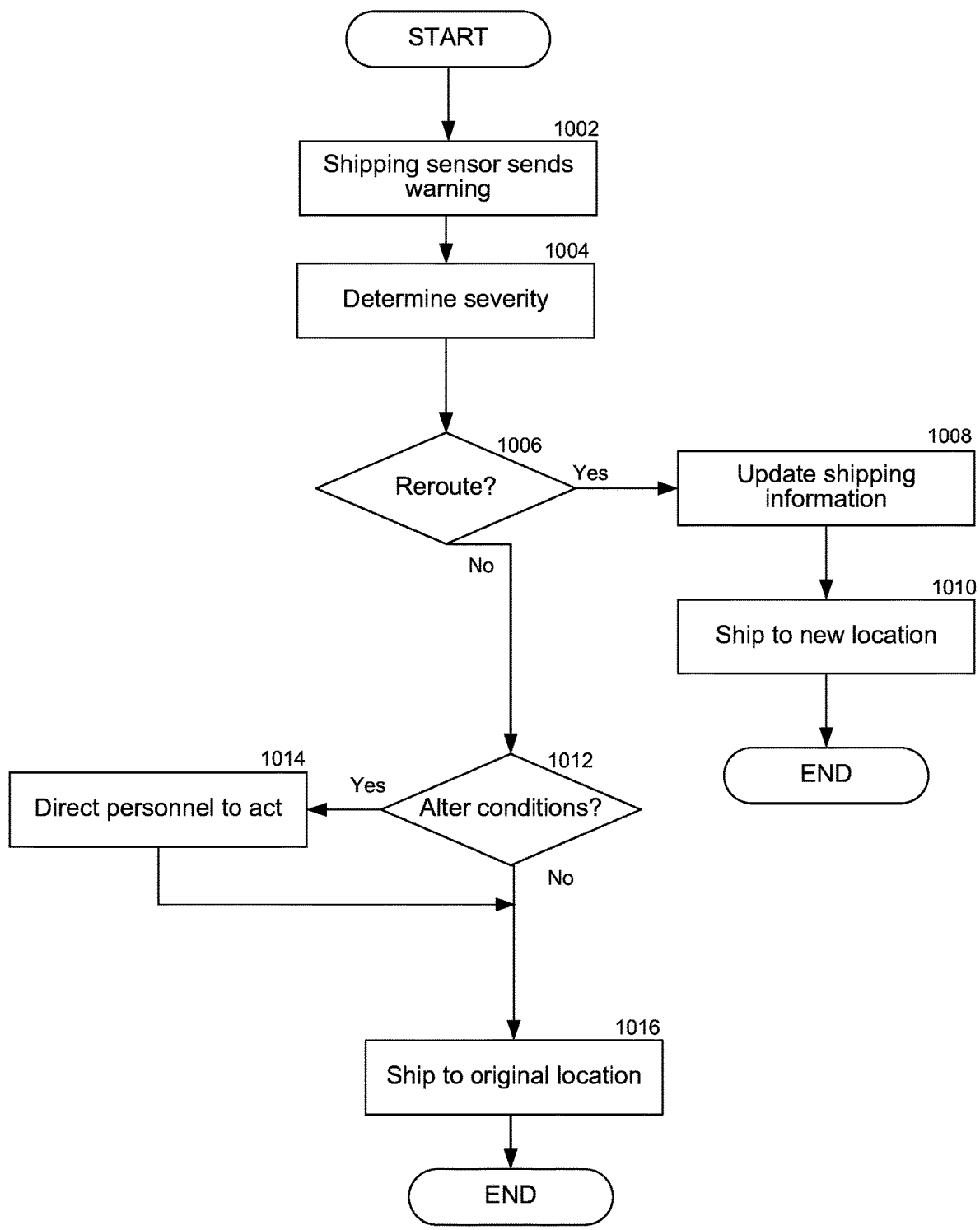
FIG. 10 is a flowchart for redirection of refrigerated shipping container based upon sensor warning.

FIG. 10 is a flowchart for redirection of refrigerated shipping container based upon sensor warning. In step 1002, while during shipping one or more of the sensors of FIG. 9 registers a warning to the server. In step 1004, server operation will determine the severity of the warning as compared to the refrigerated container's itinerary. Such comparison includes factors such as the time remaining on the shipping itinerary, the predicted weather conditions in the remaining legs of the shipping route, the nature of the threshold, the locations of other shipping refrigerators, the destinations of those refrigerators, and the warning status of the other refrigerators in the shipping swarm.

In step 1006, based upon the determination of severity, remediation measures are taken. If the refrigerator has a minimally severe warning and is near the destination, server operation will no instruct for a route change. In step 1008, if there is a severe warning, and the shipping itinerary includes a long journey, server operation will direct that refrigerator to a closer destination, and direct another shipping refrigerator with similar payload, without a warning, to replace the damaged refrigerator's route. In some cases, the new destination for the damaged shipping refrigerator is a disposal facility.

In step 1010, rerouting is conducted by shipping personnel through use of the surface labels on the shipping refrigerators.

In step 1012, when the warning is not so severe as to reroute a shipping refrigerator, in some cases the shipping refrigerator is adjusted. In step 1014, personnel are directed to make adjustments including reattaching the refrigerator to a power source and generating more ice, changing the orientation of the refrigerator, moving the refrigerator to a cooler location, or any other reasonable spot adjustments known in the art.

In step 1016, a shipping refrigerator that is not re-routed is delivered to the original destination.

Figure 11:
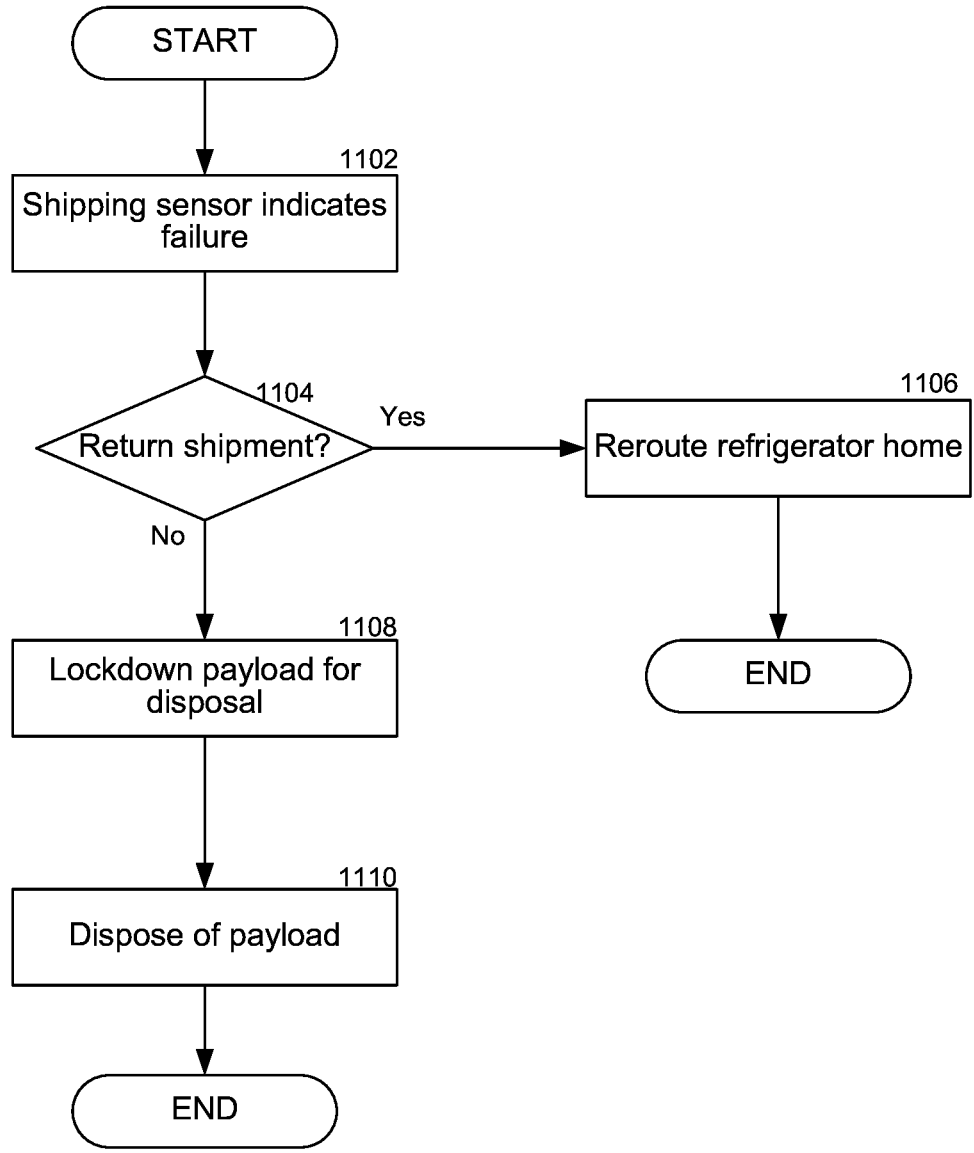
FIG. 11 is a flowchart of distribution prevention based on sensor failure.

FIG. 11 is a flowchart of distribution prevention based on sensor failure. In step 1102, when onboard sensors generate enough warnings, a final "catastrophic failure" warning is generated and forwarded to the server. When this occurs, in step 1104, the server operation determines the most cost efficient action.

The payload is either returned, or the payload is sent to the destination but prevented from distribution. The determination depends on how close or far the shipping refrigerator is from the destination. In step 1106, if it is more cost efficient to send the refrigerator back to origin, this is the outcome. In step 1108, if it is cheaper to have a technician resolve the issue at the destination, this is the outcome.

Where the shipping refrigerator reaches the destination, and catastrophic failure occurs, the distribution mechanism is disabled. The means for removing the payload from the shipping refrigerator is disabled until a technician with special access unlocks the shipping refrigerator. In step 1110, the technician will dispose of the payload as necessary.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A functionally orientation agnostic, mobile refrigeration apparatus, comprising:
    an insulated container having payload space;
    a thermally conductive spherical shell ("spherical shell") contained within the insulated container and configured to be full of water;
    a cooling element for generating ice from the water contained within the spherical shell, the cooling element suspended centrally in the spherical shell; and
    an insulator cup that is thermally insulating and housed within the spherical shell and configured to contain the cooling element positioned centrally in the spherical shell, the insulator cup having an upper lip from which higher-density water within the thermally conductive spherical shell spills from, the insulator cup further configured to be oriented continuously upright despite the orientation of the insulated container and enabled for water contained within the spherical shell to pass in and out of the top of the insulator cup.

2. The apparatus of claim 1, further comprising:
    a powered rotation bar upon which the cooling element, the insulating cup, and spherical shell are mounted on, and where the spherical shell and cooling element are mounted to the powered rotation bar in a fixed orientation and the insulator cup is mounted to the powered rotation bar in a freely rotating configuration; and
    a circular powered rail fixed internally to the insulated container and upon which the powered rotation bar is mounted;
    wherein the powered rotation bar rotates freely within the circular powered rail such that despite the orientation of the insulated container, the powered rotation bar is in a horizontal orientation, and the circular powered rail draws power from an external source, and delivers power to the powered rotation bar, which in turn delivers power to the cooling element.

3. The apparatus of claim 1, further comprising:
supports which mount the spherical shell centrally in the insulated container and include embedded electrical wiring from the exterior of the insulated container to the spherical shell; and
a gimbal mounted inside the spherical shell and configured to maintain and upright orientation for the insulator cup and including embedded electrical wiring which delivers power from the supports to the cooling element.

4. The apparatus of claim 1, further comprising:
a buoyant top affixed to the top of the insulator cup which ensures the upright orientation of the insulator cup;
a pipe affixed to the cooling element and oriented to pass through the buoyant top, the pipe including electrical wiring to provide power to the cooling element; and
a hatch on the surface of the spherical shell;
wherein orienting the hatch as the top of the spherical shell additionally orients the pipe with the hatch and provides users access to the electrical wiring.

5. The apparatus of claim 1, further comprising:
netting strung across the insulator cup and above the cooling element configured to catch and collect ice that breaks off of the cooling element.

6. The apparatus of claim 1, the cooling element further comprising:
an ice growth sensor which is configured limit the growth of ice around the cooling element such that the cooling element shuts off when ice reaches a predetermined growth size.

7. The apparatus of claim 1, further comprising:
vending machine controls mounted on the exterior of the insulated container and enabling users to select payload items; and
a vending machine dispenser mounted inside the insulated container and configured to eject a selected payload item from the insulated container.

8. The apparatus of claim 7, wherein the vending machine controls comprise a biometric scanner.

9. The apparatus of claim 1, wherein the internal temperature of the insulated container is maintained at four degrees Celsius.

10. The apparatus of claim 9, wherein the payload space includes vaccines and/or medicine.

11. The apparatus of claim 1, further comprising:
a controller;
a plurality of thermometers positioned at a number of locations both internally and externally to the insulated container and in communication with the controller;
a humidity sensor mounted internally to the insulated container and in communication with the controller;
a gyroscope sensor mounted to the insulated container and in communication with the controller;
a geo-positioner mounted to the insulated container and in communication with the controller;
an accelerometer mounted to the insulated container and in communication with the controller; and
a network communicator mounted to the insulated container and in communication with the controller, and providing data from other components in communication with the controller to an external network.

12. The apparatus of claim 11, further comprising:
a shipping network server in communication with the external network and monitoring the shipping progress of the insulated container and transmitting updated shipping instructions for the insulated container over the external network.

13. A mobile refrigeration apparatus, comprising:
an insulated container having payload space;
a thermally conductive spherical shell ("spherical shell") contained within the insulated container and configured to be full of water;
a block of ice suspended at centrally in the spherical shell;
a thermally insulating cup ("insulator cup") housed within the spherical shell and configured to contain the block of ice, the insulator cup having an upper lip from which higher-density water within the spherical shell spills from, the insulator cup configured to be oriented continuously upright despite the orientation of the insulated container and enabled for the water contained within the spherical shell to exchange thermal energy with the block of ice through a fully exposed face.

14. The apparatus of claim 13, further comprising:
netting strung across the insulator cup and above the block of ice configured to position and collect ice that breaks off of the block of ice.

15. The apparatus of claim 13, further comprising:
a buoyant top affixed to the top of the insulator cup which ensures the upright orientation of the insulator cup.

16. The apparatus of claim 13, wherein the internal temperature of the insulated container is maintained at four degrees Celsius.

17. The apparatus of claim 16, wherein the payload space includes vaccines and/or medicine.

18. A method for operating an orientation agnostic refrigerator, the method comprising:
generating a block of ice about a cooling element contained within a self-orienting insulator cup inside a thermally conductive spherical shell ("spherical shell") filled with water, and wherein the block of ice causes the temperature of the water closest to the spherical shell to be maintained at four degrees Celsius;
enabling water cooler than four degrees Celsius and proximate to the block of ice to rise up and out of the insulator cup over an upper lip from which higher-density water within the spherical shell spills from, and water that approaches four degrees Celsius while warming to drop into the insulator cup and cool while proximate to the block of ice;
where the spherical shell is contained within an insulated container, reorienting the insulated container such that another face of the insulated container is upright; and
in response to said reorienting the insulated container, reorienting the insulator cup such that the top of the cup orients with the face of the insulated container that is currently upright.

19. The method of claim 18, further comprising:
monitoring block of ice size with an ice growth sensor;
in response to the block of ice dropping below a predetermined size threshold, generating additional ice with the cooling element.

20. The method of claim 18, further comprising:
monitoring block of ice size with an ice growth sensor;
monitoring insulated container location by a location aware device onboard the insulated container;
calculating, by a processor, the rate of ice melt compared to the distance from nearest source of power to determine a projected time of temperature failure referenced with time from nearest power source;
issuing modified shipping instructions for the insulated container by a shipping network server to redirect the insulated container to a first known source of power based upon the projected time of temperature failure.

21. The method of claim 18, further comprising:
receiving a vending request from vending controls on exterior of the insulated container; and
ejecting items from payload space of the insulated container according to the vending request.

* * * * *